3,086,632
ONE-WAY ROLLER CLUTCH
Daniel M. Wade, River Forest, and Ernest A. Ferris, Downers Grove, Ill., assignors to Borg-Warner Corporation, a corporation of Illinois
Filed Oct. 10, 1961, Ser. No. 144,234
9 Claims. (Cl. 192—45)

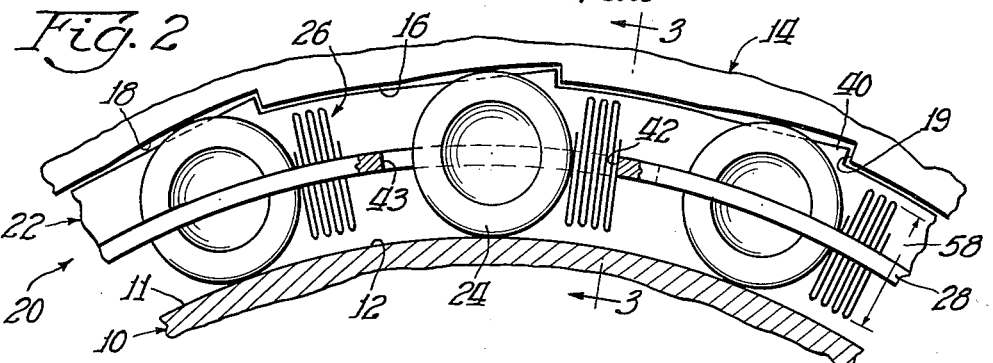
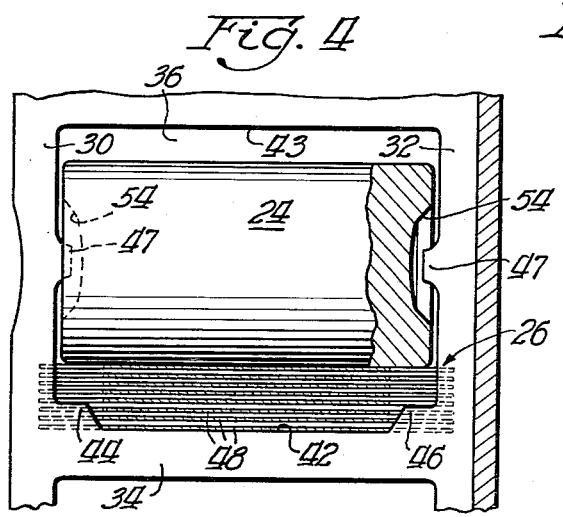
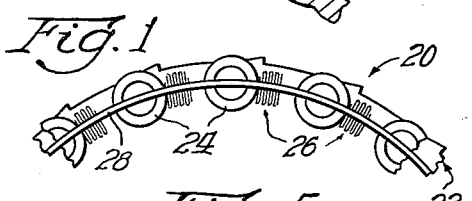
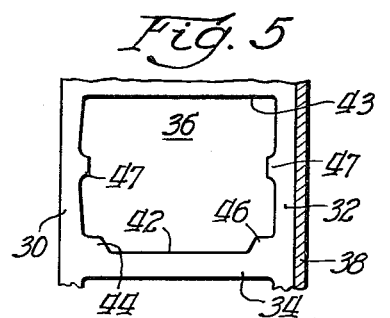
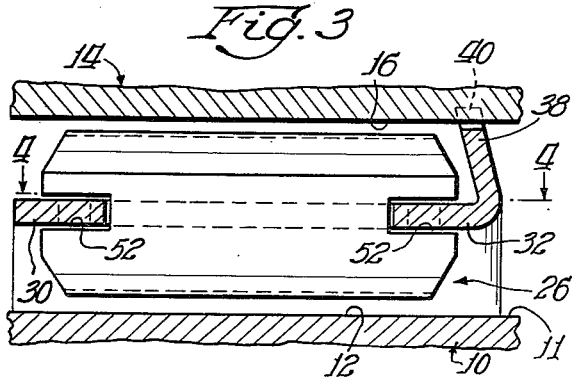
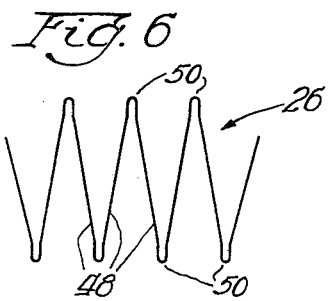
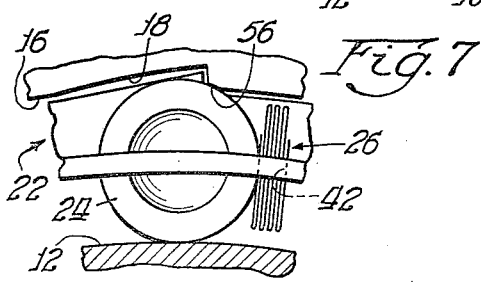
Inventors:
Ernest A. Ferris
and Daniel M. Wade United States Patent Office 3,086,632
Patented Apr. 23, 1963

This invention relates to one-way clutches and more particularly to a one-way clutch of the roller and cam type to prevent relative rotation between races in one direction while permitting free relative rotation in the opposite direction.

One of the problems that has been encountered with this type of one-way clutch in the past involves the failure of individual energizing springs associated with the wedging elements. More specifically it has been found in the past that the type of springs used and the method in which the were positioned in the device has a definite bearing on the life of the spring and consequently on the operation and life of the whole device as well. Springs are sometimes displaced from their normal position resulting in their destruction and eventual failure of the whole clutch mechanism.

Another one of the problems that has existed with respect to this type of device is that of cutting the manufacturing cost to a minimum without reducing the quality.

Accordingly one of the principle objects of this invention is to provide in a one-way roller clutch assembly having individual springs for energizing each of the rollers and improved means for mounting the spring on the roller cage member to prevent dislodging of the spring from its normal position.

Another object of this invention is to provide a unitary preassembled roller and cage assembly for use in a one-way clutch device which is inexpensive to manufacture, easy to assemble and easy to handle as a complete unit.

Another object is to provide in the roller, spring and cage asembly, abutment means formed in the roller cage openings to act as roller stops and prevent overcompression of the energizing springs.

A still further object of the invention is to provide a means for mounting the spring means in the assembly in such a manner as to preclude contact with either of the races.

The above and other objects and advantages of the invention will be more readily apparent when read in connection with the accompanying drawings in which:

FIG. 1 is a partial elevational view of the roller, cage and spring assembly;

FIG. 2 is an enlarged partial elevational view partially in section of a clutch device showing the unitary roller, cage and spring assembly positioned between inner and outer races;

FIG. 3 is an enlarged elevational view taken along the line 3—3 of FIG. 2 showing one of the energizing springs positioned on the cage member;

FIG. 4 is a view partially in section taken along the line 4—4 of FIG. 3;

FIG. 5 is a view of the cage member before the roller is permanently inserted;

FIG. 6 is a side view of one of the energizing springs;

FIG. 7 is a view showing the roller stop means on the cammed race to prevent overcompression of the spring member.

Referring now to the drawings wherein like numerals on different views identify identical parts, the device shown in FIGS. 1 and 3 as partial views comprises a shaft 10 on which there is formed a cylindrical surface 11 and on part of which cylindrical surface there is fomed an inner race 12. An annular member 14 is concentrically disposed about the shaft 10. An outer race 16 comprising a series of cammed surfaces 18 are formed on the member 14. A unitary preassembled roller and cage assembly 20 is disposed between the members 10 and 14. While the description herein will refer to a clutch unit in which the cammed race is formed on the outer race it will be appreciated that principles of the invention herein are equally applicable if the cammed race is on the inner race.

For purposes of the description herein the shaft 10 may sometimes be referred to as the driving member and the annular section 14 as the driven member. It will be appreciated that the function of the two members may be reversed. The preassembled roller and cage assembly 20 disposed between the inner race 12 and the outer race 16 prevents relative rotation between the driving and driven members in one direction while permitting relative rotation between the same members in the opposite direction. The roller and cage assembly 20 comprises a cage reaction member 22, a plurality of roller wedging elements 24 and a plurality of individual accordion type energizing spring members 26 respectively associated with each of the roller elements and mounted on the cage member. This roller and cage assembly is a preassembled unit which may be easily installed as a unit between inner and outer race members.

The cage member 22 comprises a cylindrical axially extending portion 28 on which there are formed two side bar portions 30 and 32 and a plurality of cross-bar portions 34 interconnecting the side bars to thus define a series of cage windows or openings 36 adapted to support the roller elements and the energizing springs. The cage member is a fairly rigid structure and may be made for example of metal approximately .040" thickness. On the side bar 32 there is formed an outwardly substantially radially extending flange 38. The flange 38 has formed thereon a series of substantially saw-tooth-like configurations so that high points 40 are adapted to coact with the high points 19 of the cammed outer race 16.

Each of the cage windows or openings 36 are separated by the cross-bar portions 34 on which are formed the edges 42 and 43. On the edge 42 are formed a pair of shoulders 44 and 46 which extend circumferentially a distance $d$ from the edge 42. The purpose of these shoulders will hereinafter be described in more detail. Projections 47 are formed on each of the side bar portions 30 and 32 defining the sides of the cage windows 36. These projections 47 support the roller elements.

The spring elements 26 are of the accordion type. Each consists of a plurality of leaves 48 which are joined at opposite ends to the next adjacent leaf by filleted portions 50. This filleted construction is effective to provide the spring with the capacity to more effectively retain its resiliency under constant loading and unloading cycles. Each of the leaves 48 of the spring 26 has formed at each side thereof notches or slots 52 adapted to receive the side bar portions 30 and 32 of the cage member 22. The dimensions of the openings 36 and the springs 26 are such that the spring may be easily inserted into the opening 36 at a diagonal of that opening and then positioned in the opening 36 so that the side bars 30 and 32 fit into the slots 52 of each of the leaves of the spring. Thus, in an assembled condition the spring member is slidingly positioned on the side bars 30 and 32 which act in a sense as rails as the spring is compressed and expanded.

It will be noted in FIG. 4 that the axial depth of the slots on each side is deep enough so that the spring rides over the shoulder portions 44 and 46 and thus has its end leaf positioned against the edge 42.

The rollers 24 have formed at the end, thereof indentations 54 for receiving the projections 47 formed on each of the side bars 30 and 32 and projecting into the opening 36. In the assembled condition the projections 47 permanently retain the rollers in the cage member but are small enough in relation to the indentations 54 to permit considerable radial and circumferential freedom of movement of the roller with respect to the cage member. The roller 24 is thus positioned between the edge 43 of the opening 36 and the spring 26. The manner in which the roller is assembled into the cage is explained in more detail in the co-pending application of Daniel M. Wade, Serial Number 88,755, filed February 13, 1961.

It will be observed in the assembled unit that when the roller is pused toward the edge 42 of the opening 36 the roller is limited in its movement in that it abuts against the shoulders 44 and 46 thus limiting the compression that may be exerted on the spring element.

In a modified form of the invention (see FIG. 7) the roller cage may be so positioned with respect to the cammed race that upon disengagement the roller pops against the curved portion 56 formed on the cammed race 16. In the overall clutch assembly the end of the curved portion 55 would be so positioned with respect to the edge 42 of the cage member that the spring 26 cannot be overcompressed.

The height 58 of the spring members is such that on either expanded or compressed condition they operate free of contact with either the outer or inner races. The method of mounting, of course, helps to assure that no such contact occurs.

Operation

Referring now specifically to FIG. 2 it will be apparent that when the shaft 10 is turned in a clockwise direction relative to the member 14 the device will be in an overrunning condition and the driving and driven members will not rotate as a unit. On the other hand if the shaft 10 is rotated in a counter-clockwise direction relative to the member 14 the driving and driven members will rotate as a unit. In the latter circumstances each of the energizing springs 26 will also tend to urge the respective rollers with which they are associated into wedging engagement with the inner race 12 and with the cammed surfaces 18 of the outer race. Even when the clutch device is so loaded, that is, when the rollers are in wedging engagement with the two races and the two members rotate as a unit, rapid unloading of individual roller wedging elements sometimes takes place. This may be due, for example, to foreign matter which may get into the clutch. This rapid unloading is often accompanied by tremendous force thus compressing each of the springs 26. It is at this moment that it becomes particularly important that the spring members are adequately supported to prevent their becoming dislodged from their supporting position and jamming between rollers and the races. This is a common failing even in some present-day constructions especially if the springs are merely floating between the rollers and the races. Obviously, in the event such a condition occurs the efficiency of the device is seriously hampered as successive spring elements become jammed or completely destroyed due to the tremendous force of the pop-out action of the rollers during a disengaging cycle. It is for this reason that the support of the spring elements to prevent such dislodging and possible jamming is so important.

Thus, we have found that this particular construction in which the spring elements 26 are slotted and ride on the side bars has provided the solution to the problem of spring jamming which occurs, for example, when the spring elements are permitted to ride loosely in their environment or are attached in such a way that they are easily dislodged. This construction also has the advantage that the spring elements are prevented from contacting either of the races so that there is no wear on the spring elements from such contact. We also have advantageously provided means to prevent injury to the spring elements from overcompression.

In addition, of course, the cage roller and gripper assembly disclosed provides a complete package which is simple to handle as a unit, that is, a cage member, rollers and spring members are contained in one unitary assembly.

While a preferred embodiment of the invention has been specifically disclosed it is understood that the invention is not limited thereto as other variations will be readily apparent to those skilled in the art and the invention is to be given its fullest possible interpretation within the terms of the following claims.

We claim:
1. In a unitary cage and roller assembly the combination comprising: an axially extending cage member, said cage member comprising two side bars and interconnecting cross-bar members defining openings in said cage member for receiving roller wedging elements; a plurality of roller wedging elements mounted in said cage member; and a plurality of accordion type spring means associated respectively with each of said wedging elements and mounted on said cage member, and means defining slots formed on each side of said spring means for mounting said spring means on said cage member.

2. The device of claim 1 wherein the slots and cage member are constructed and arranged so as to limit radial movement of the springs with respect to the cage member.

3. The device of claim 1 wherein shoulder means are formed on one end of the openings to act as stops for the rollers so as to allow only a predetermined amount of compression of the spring means, when acted upon by said roller elements.

4. The device of claim 1 wherein means for mounting the roller elements in said cage member include projections on the side bars which extend into the openings in said cage member and indentations in said rollers for receiving said projections.

5. A one-way engaging device comprising: outer and inner races formed on concentrically disposed rotatable driving and driven members, one of said races having a plurality of cammed surfaces formed thereon; an axially extending cage member disposed between said races and comprising side bars and interconnecting cross bars defining openings for receiving roller wedging elements; a plurality of roller elements disposed between said outer and inner race surfaces and supported in said openings; accordion type spring means supported on the side bars of said cage member; means defining slots in the sides of said spring means for receiving portions of the cage member so that said portions act as a rail to provide a sliding support for said spring means during extension and compression of said spring means.

6. The device of claim 5 wherein the slots and cage member are constructed and arranged so as to limit radial movement of the springs with respect to the cage member and thus prevent contact of any part of the springs with either of the races.

7. The device of claim 5 wherein means are provided to limit the maximum travel of the roller to prevent excessive compression of the spring means.

8. The device of claim 7 wherein such means comprises stop means formed on the cammed race.

9. The device of claim 7 wherein such means comprises shoulders formed at one end of the roller receiving openings in the cage member.

References Cited in the file of this patent

UNITED STATES PATENTS

| | | |
|---|---|---|
| 2,363,785 | Gold | Nov. 28, 1944 |
| 2,532,981 | Wolfe | Dec. 5, 1950 |
| 2,753,027 | Troendly et al. | July 3, 1956 |
| 2,843,238 | Rozner | July 15, 1958 |
| 2,973,847 | Stockton | Mar. 7, 1961 |
| 2,998,113 | Marland | Aug. 29, 1961 |

FOREIGN PATENTS

| | | |
|---|---|---|
| 1,068,925 | Germany | Nov. 12, 1959 |